2 Sheets--Sheet 1.
E. G. MORRISON.
Dough-Mixer.
No. 162,187.
Patented April 20, 1875.
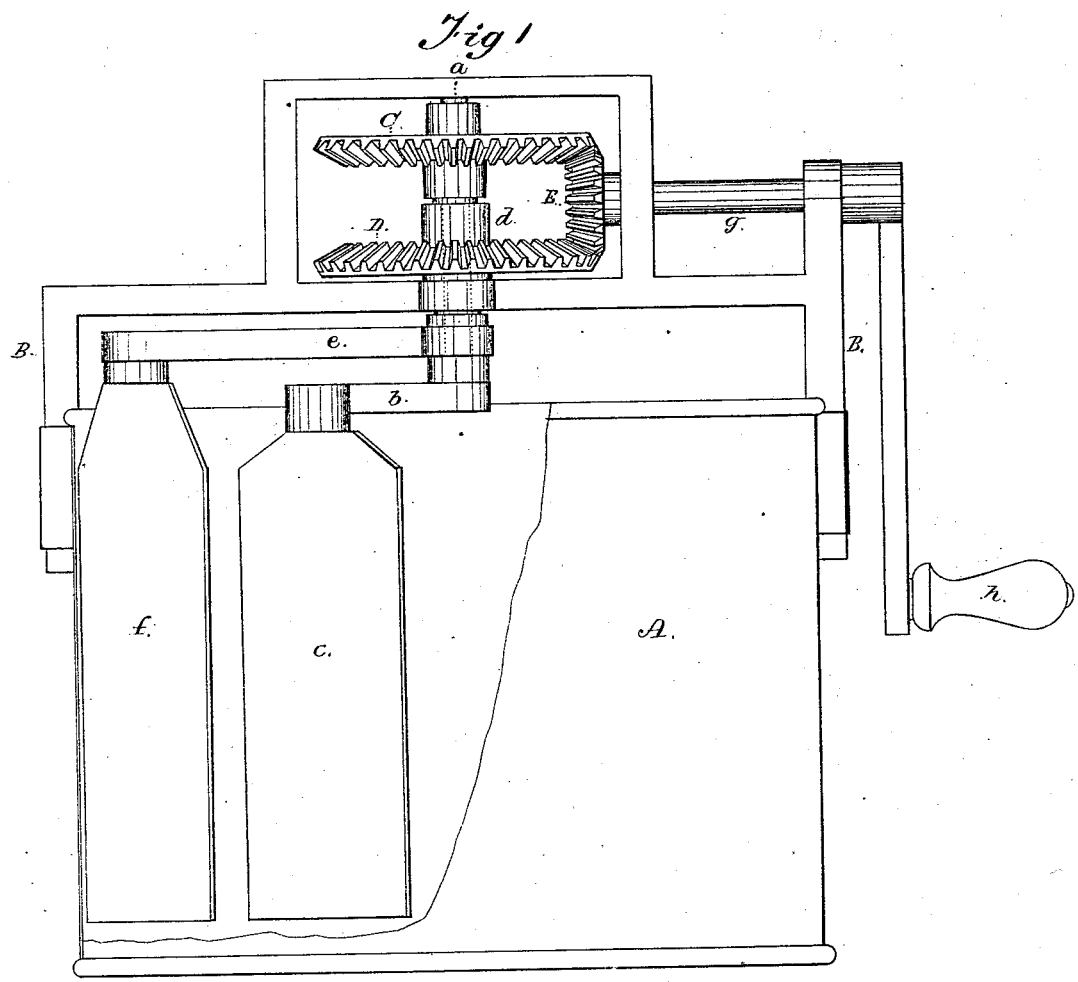
Witnesses.
Geo Gray
F. C. Hale
Elbridge G. Morrison
By his atty
F. P. Hale

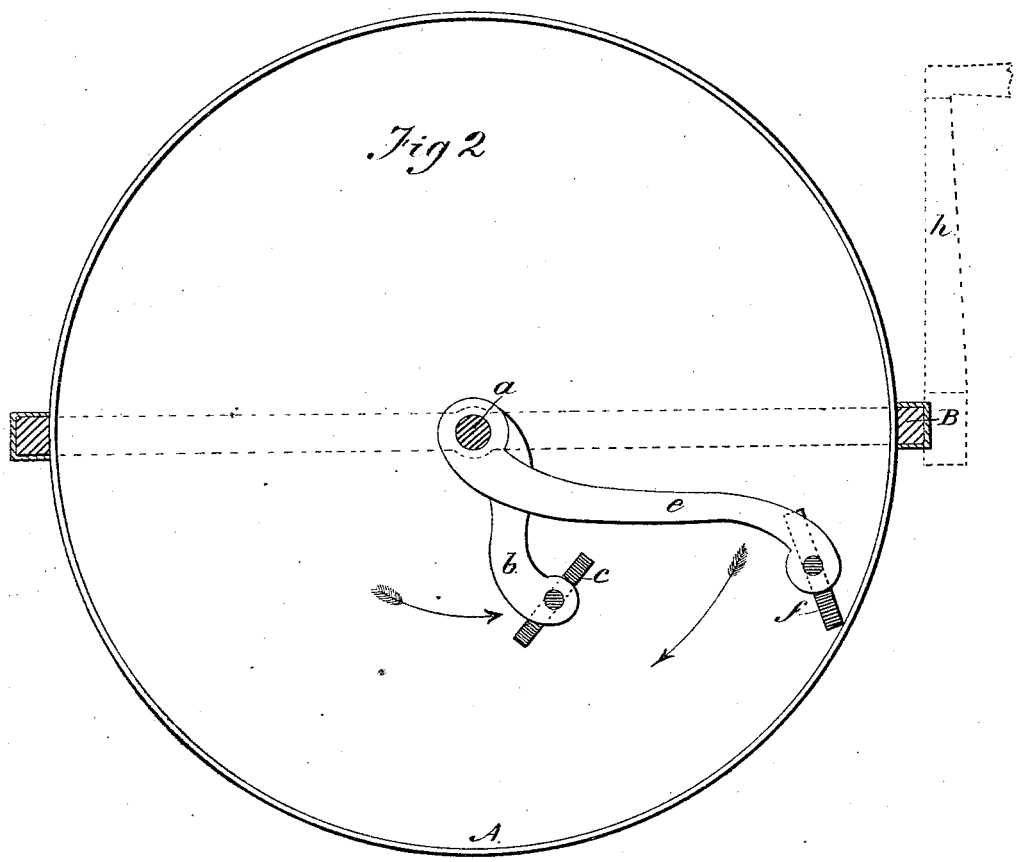

UNITED STATES PATENT OFFICE.

ELBRIDGE G. MORRISON, OF HAVERHILL, MASSACHUSETTS, ASSIGNOR TO HIMSELF AND ELIJAH MORRISON, OF RAYMOND, NEW HAMPSHIRE.

IMPROVEMENT IN DOUGH-MIXERS.

Specification forming part of Letters Patent No. 162,187, dated April 20, 1875; application filed June 10, 1874.

*To all whom it may concern:*

Be it known that I, ELBRIDGE G. MORRISON, of Haverhill, in the county of Essex and State of Massachusetts, have invented a new and useful Improvement in Dough-Mixers; and I do hereby declare that the following is a full, clear, and exact description thereof, which will enable others skilled in the art to which it pertains to make and use the same, reference being had to the accompanying drawing and to the letters of reference marked thereon, which form a part of this specification.

My invention has reference to that class of devices used for combining or mixing and kneading the materials to form bread, cake, &c.; and consists in the peculiar construction and arrangement of the several parts, as hereinafter described and claimed.

In the drawing, Figure 1 represents a side elevation of my invention, partially broken away to show the stirrers; and Fig. 2, a plan view of the same with the gearing mechanism removed.

To enable others skilled in the art to make and use my invention, I will now proceed to describe fully its construction and manner of operation.

A denotes a cylindrical vessel, open at top, and of any desirable capacity, the same being made of tin or other suitable material. B represents a metallic frame, which is mounted on the top of the reservoir A, and so as to be readily applied thereto or removed therefrom, as circumstances may require. This frame supports two beveled cogged wheels or gears, C D, the upper one, C, of which is affixed to a vertical spindle, $a$, which extends down through the frame, and carries on its lower end a short horizontal curved arm, $b$, to which a blade or stirrer, $c$, is affixed. The gear D is affixed to a sleeve, $d$, enveloping the said spindle, and has affixed to its lower end an arm, $e$, to which a blade or stirrer, $f$, is secured. E is a small bevel-gear, which engages or meshes into both of the gears C D, the gear E being connected to the end of a horizontal shaft, $g$, supported in bearings in the frame, and carrying on its outer end a crank or handle, $h$. The blade or stirrer $f$ is so arranged upon its arm $e$ that the former, when in revolution, shall travel in close contiguity with the walls or sides of the reservoir, the blade being arranged on the arm at such an angle as will move the mass of dough from the circumference toward the center of the reservoir or vessel, while the stirrer $c$, affixed to the shorter arm, has its path of revolution within that of the blade $f$, the blade or stirrer $c$ being disposed at such an angle as to move the contents of the vessel from its center outward.

From the above it will be seen that, by taking hold of the handle and rotating the same, the blades or stirrers will be caused to travel in opposite directions and in different paths, and that the mass of flour and materials to be combined will, by their action, be most thoroughly mixed and kneaded.

I would remark that, by adding a cover to the reservoir A, the device may be employed to good advantage in churning cream, as well as for agitating the freezing mixture for making iced cream.

I am aware that it is common to revolve blades or stirrers in opposite directions by gearing mechanism similar to mine, and this feature I do not claim; but Having fully described my invention, what I claim as new, and desire to secure by Letters Patent, is—

In a dough-mixer having mechanism, substantially as described, for giving the mixing-stirrers movement in opposite directions, the stirrers $c f$, the first of which is set at an angle, the edge nearest the axis being advanced in the direction of rotation, for the purpose of throwing the dough from the center, and the second at an angle with the edge farthest from the axis advanced in the direction of its rotation, for the purpose of throwing the dough to the center, substantially as described.

In testimony that I claim the foregoing as my own invention I affix my signature in presence of two witnesses.

ELBRIDGE G. MORRISON.

Witnesses:
 F. P. HALE,
 GEO. GRAY.